Aug. 14, 1962    W. H. NEWELL    3,049,294
VELOCITY AND DISTANCE INDICATING SYSTEM
Filed Jan. 23, 1957    3 Sheets-Sheet 1

INVENTOR
WILLIAM H. NEWELL
BY
ATTORNEY

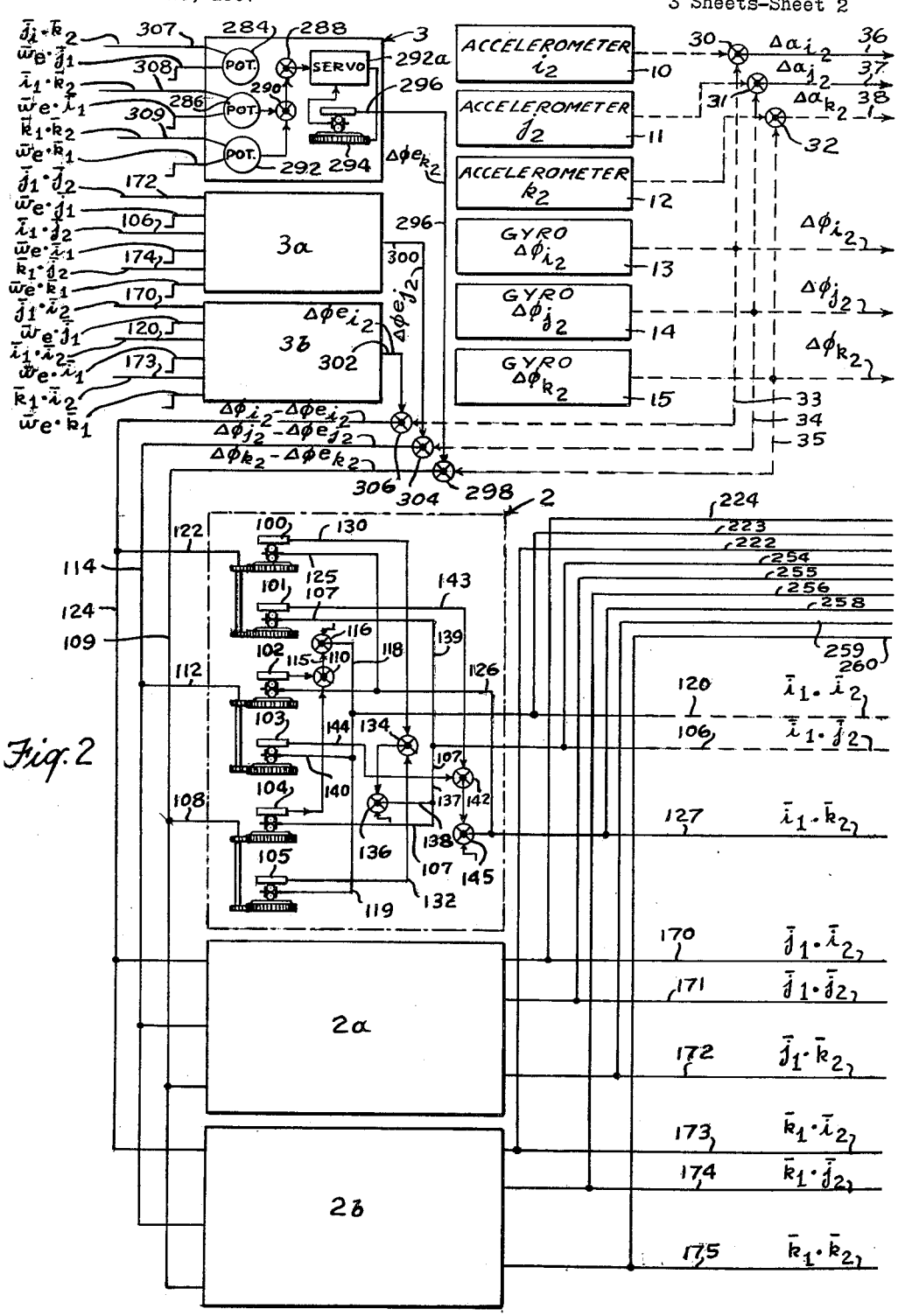

United States Patent Office 3,049,294
Patented Aug. 14, 1962

3,049,294
VELOCITY AND DISTANCE INDICATING SYSTEM
William H. Newell, Mount Vernon, N.Y., assignor to Sperry Rand Corporation, Ford Instrument Company Division, Long Island City, N.Y., a corporation of Delaware
Filed Jan. 23, 1957, Ser. No. 635,757
4 Claims. (Cl. 235—151)

This invention relates to a velocity and distance indicating system which is arranged to convert known velocity components referred to a coordinate system defined in a flying body to velocity components in a coordinate system whose origin is located on the earth's surface.

The system has application to missiles which are capable of conveying accelerometers and gyros for instantaneously measuring linear and angular velocities along coordinate axes which are fixed relative to the missile but which are in motion with respect to some other coordinate system that may be desired as a reference. Also the missile must have means for telemetering information to the ground observer operating the indicating device which embodies the subject invention.

It is an object of the invention to provide means for computing the velocity of a missile for test purposes, such computations being hitherto performed by radar tracking with less accuracy than that which the present device is capable. The device is responsive to very slight changes in velocity and it is therefore contemplated that it can also provide sufficiently accurate information to determine directly the altitude of the moving missile.

Another object of the invention is to provide means for establishing vectorial quantities with respect to an inertial space system but referred to a missile coordinate system and converting them to a reference system in which distance and velocity of the missile are determined with respect to the point of origin of the latter system.

Figure 1:
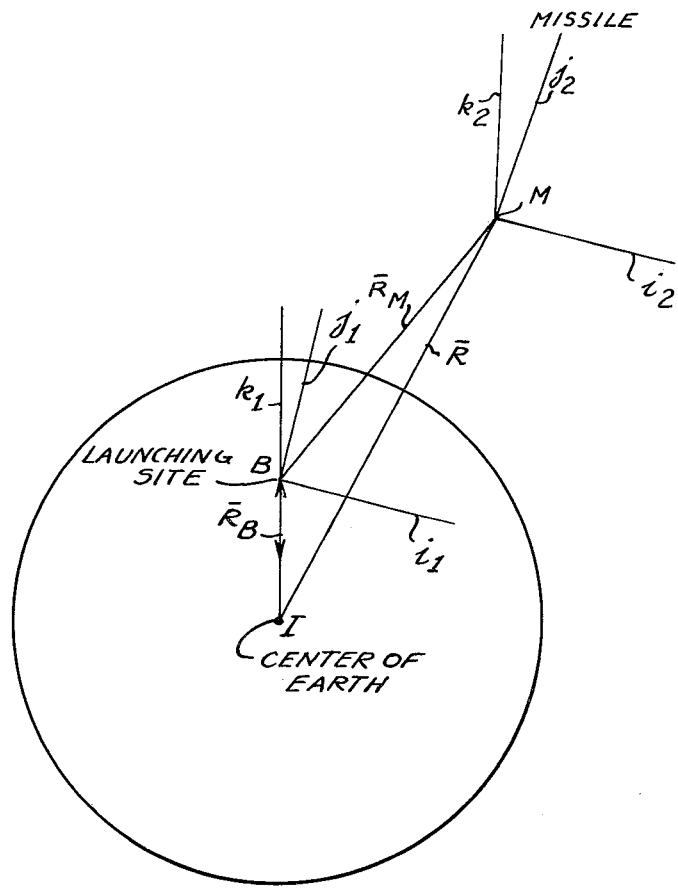
Figure 2A:
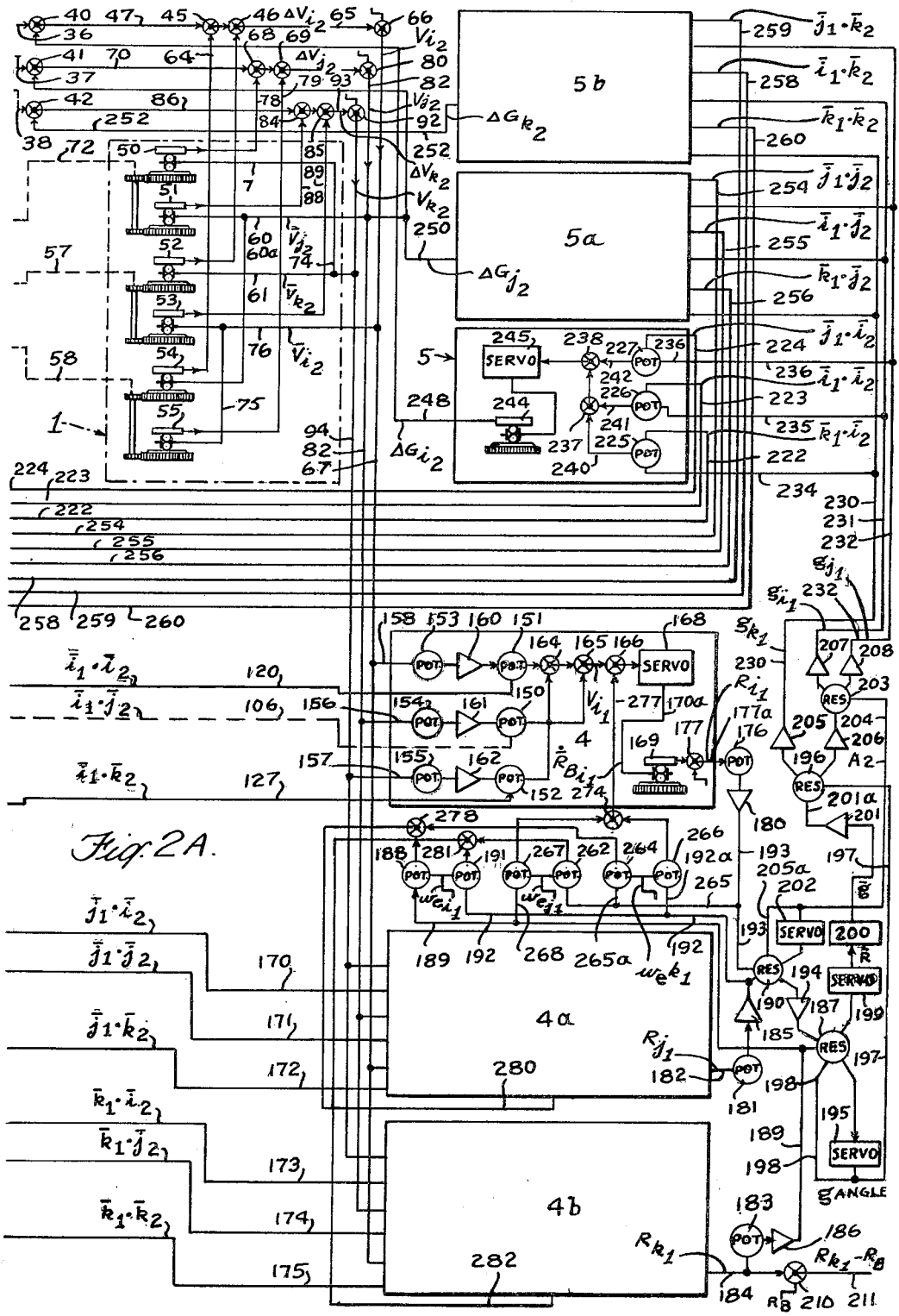

Other objects and advantages of the invention will be apparent on reading the following description in conjunction with the accompanying drawings, in which FIG. 1 is a schematic showing the two systems of coordinates involved in the series of computations performed by the device; and FIGS. 2 and 2A are a general schematic of the velocity and distance indicating system.

Referring to FIG. 1, a missile M which was launched at a launching site B has referred to it an $i_2, j_2, k_2$ coordinate system fixed to the missile with an origin at the missile's center of gravity. What is required is the components of the vector $\bar{R}_M$ and $\bar{R}_B$ in the $\bar{i}_1, \bar{j}_1, \bar{k}_1$, coordinate system having its origin at B, the vector $\bar{R}_M$ extending from the launching site B to the missile M. The vector $\bar{R}$ extends from the center of the earth I to the missile M and its velocity components, $V_{i_2}$, $V_{j_2}$, and $V_{k_2}$ in the missile system with respect to inertial space can be directly determined in accordance with the following equations:

(1) $V_{i_2} = \int a_{i_2} dt + \int V_{j_2} d\phi_{k_2} - \int V_{k_2} d\phi_{j_2} - \int G_{i_2} dt$ (2) $V_{j_2} = \int a_{j_2} dt + \int V_{i_2} d\phi_{k_2} - \int V_{k_2} d\phi_{i_2} - \int G_{j_2} dt$ (3) $V_{k_2} = \int a_{k_2} dt + \int V_{i_2} d\phi_{j_2} - \int V_{j_2} d\phi_{i_1} - \int G_{k_2} dt$ When $a_{i_2}$, $a_{j_2}$ and $a_{k_2}$ are acceleration components along their respective axes as sensed by missile accelerometers described in my copending application Ser. No. 625,544, filed November 30, 1956, $\phi_{i_2}$, $\phi_{j_2}$ and $\phi_{k_2}$ are the longitudinal angular displacements of the respective axes as sensed by the rate gyros described in that application, and $G_{i_2}$, $G_{j_2}$ and $G_{k_2}$ are the acceleration components due to the gravitational attraction of the earth.

These velocity components in the missile or $\bar{i}_2, \bar{j}_2, \bar{k}_2$ system with respect to inertial space may be converted to velocity components in the base or $\bar{i}_1, \bar{j}_1, \bar{k}_1$ system with respect to inertial space by means of the direction cosines between the two sets of orthogonal unit vectors, namely:

(4)

|       | $\bar{i}_1$ | $\bar{j}_1$ | $\bar{k}_1$ |
|-------|-------------|-------------|-------------|
| $i_2$ | $\bar{i}_2 \cdot \bar{i}_1$ | $\bar{i}_2 \cdot \bar{j}_1$ | $\bar{i}_2 \cdot \bar{k}_1$ |
| $j_2$ | $\bar{j}_2 \cdot \bar{i}_1$ | $\bar{j}_2 \cdot \bar{j}_1$ | $\bar{j}_2 \cdot \bar{k}_1$ |
| $k_2$ | $\bar{k}_2 \cdot \bar{i}_1$ | $\bar{k}_2 \cdot \bar{j}_1$ | $\bar{k}_2 \cdot \bar{k}_1$ | and if (5) $\dot{\bar{R}}_I = \bar{V}_{i_2} + \bar{V}_{j_2} + \bar{V}_{k_2}$ $\dot{\bar{R}}_I$ is the time rate of change of the position vector with respect to inertial space and (6) $\dot{\bar{R}}_I = \bar{V}_{i_1} + \bar{V}_{j_1} + \bar{V}_{k_1}$ then (7) $V_{i_1} = (\bar{i}_1 \cdot \bar{i}_2) V_{i_2} + (\bar{i}_1 \cdot \bar{j}_2) V_{j_2} + (\bar{i}_1 \cdot \bar{k}_2) V_{k_2}$ (8) $V_{j_1} = (\bar{j}_1 \cdot \bar{i}_2) V_{i_2} + (\bar{j}_1 \cdot \bar{j}_2) V_{j_2} + (\bar{j}_1 \cdot \bar{k}_2) V_{k_2}$ (9) $V_{k_1} = (\bar{k}_1 \cdot \bar{i}_2) V_{i_2} + (\bar{k}_1 \cdot \bar{j}_2) V_{j_2} + (\bar{k}_1 \cdot \bar{k}_2) V_{k_2}$ Hence, the velocity components $V_{i_1}$, $V_{j_1}$ and $V_{k_1}$ are referred to the base system with respect to inertial space and may be found from the known velocity components in the missile system provided the direction cosines can be determined.

Employing vector analysis, the direction cosines may be derived in terms of each other and of the angular displacements of the rotating base and missile coordinate systems with respect to the missile coordinate system. The component angular displacements of the base system with respect to the missile system are assigned the notations $\Delta \phi e_{i_2}$, $\Delta \phi e_{j_2}$ and $\Delta \phi e_{k_2}$. Accordingly the solutions for the direction cosines are given as follows:

(10) $\bar{i}_1 \cdot \bar{i}_2 = \int (\bar{i}_1 \cdot \bar{j}_2) d(\Delta \phi_{k_2} - \Delta \phi e_{k_2})$
$\qquad + \int (\bar{i}_1 \cdot \bar{k}_2) d(\Delta \phi_{j_2} - \Delta \phi e_{j_2}) + C$

(11) $\bar{i}_1 \cdot \bar{j}_2 = \int (\bar{i}_1 \cdot \bar{i}_2) d(\Delta \phi_{k_2} - \Delta \phi e_{k_2})$
$\qquad - \int (\bar{i}_1 \cdot \bar{k}_2) d(\Delta \phi_{i_2} - \Delta \phi e_{i_2}) + C$

(12) $\bar{i}_1 \cdot \bar{k}_2 = \int (\bar{i}_1 \cdot \bar{i}_2) d(\Delta \phi_{j_2} - \Delta \phi e_{j_2})$
$\qquad + \int (\bar{i}_1 \cdot \bar{j}_2) d(\Delta \phi_{i_2} - \Delta \phi e_{i_2}) + C$

(13) $\bar{j}_1 \cdot \bar{i}_2 = \int (\bar{j}_1 \cdot \bar{j}_2) d(\Delta \phi_{k_2} - \Delta \phi e_{k_2})$
$\qquad + \int (\bar{j}_1 \cdot \bar{k}_2) d(\Delta \phi_{j_2} - \Delta \phi e_{j_2}) + C$

(14) $\bar{j}_1 \cdot \bar{j}_2 = \int (\bar{j}_1 \cdot \bar{i}_2) d(\Delta \phi_{k_2} - \Delta \phi e_{k_2})$
$\qquad - \int (\bar{j}_1 \cdot \bar{k}_2) d(\Delta \phi_{i_2} - \Delta \phi e_{i_2}) + C$

(15) $\bar{j}_1 \cdot \bar{k}_2 = \int (\bar{j}_1 \cdot \bar{i}_2) d(\Delta \phi_{j_2} - \Delta \phi e_{j_2})$
$\qquad + \int (\bar{j}_1 \cdot \bar{j}_2) d(\Delta \phi_{i_2} - \Delta \phi e_{i_2}) + C$

(16) $\bar{k}_1 \cdot \bar{i}_2 = \int (\bar{k}_1 \cdot \bar{j}_2) d(\Delta \phi_{k_2} - \Delta \phi e_{k_2})$
$\qquad + \int (\bar{k}_1 \cdot \bar{k}_2) d(\Delta \phi_{j_2} - \Delta \phi e_{j_2}) + C$

(17) $\bar{k}_1 \cdot \bar{j}_2 = \int (\bar{k}_1 \cdot \bar{i}_2) d(\Delta \phi_{k_2} - \Delta \phi e_{k_2})$
$\qquad + \int (\bar{k}_1 \cdot \bar{k}_2) d(\Delta \phi_{i_2} - \Delta e_{i_2}) + C$

(18) $\bar{k}_1 \cdot \bar{k}_2 = \int (k_1 \cdot i_2) d(\Delta \phi_{j_2} - \Delta \phi e_{j_2})$
$\qquad + \int (\bar{k}_1 \cdot \bar{j}_2) d(\Delta \phi_{i_2} - \Delta e_{i_2}) + C$ The component angular displacements of the base system with respect to the missile system are determined as follows:

(19) $\Delta \phi e_{k_2} = \int [(\bar{j}_1 \bar{k}_2)(we_{j_1}) + (\bar{i}_1 \cdot \bar{k}_2)(we_{i_1})$
$\qquad + (\bar{k}_1 \cdot \bar{k}_2)(we_{k_1})] dt$

(20) $\Delta \phi e_{j_2} = \int [(\bar{j}_1 \cdot \bar{j}_2)(we_{j_1}) + (\bar{i}_1 \cdot \bar{j}_2)(we_{i_1})$
$\qquad + (\bar{k}_1 \cdot \bar{j}_2)(we_{k_1})] dt$

(21) $\Delta \phi e_{i_2} = \int [(\bar{j}_1 \cdot \bar{i}_2)(we_{j_1}) + (\bar{i}_1 \bar{i}_2)(we_{i_1})$
$\qquad + (k_1 \cdot i_2)(we_{k_1})] dt$ It is to be noted, however, that the velocity components, the expressions for which are shown by the equations 7–9, are components of the missile velocity in inertial space referred to the base system. It is therefore necessary to convert these components into velocity components of the missile with respect to the base B in place of the center of the earth I but still referred to the base coordinate system. These components are designated $$\dot{R}_{B_{i_1}}, \dot{R}_{B_{j_1}} \text{ and } \dot{R}_{B_{k_1}}$$

and the sum of the integrals of these components is the required vector quantity $\bar{R}_m$. They are computed in accordance with the following equations:

(22) $\qquad \dot{R}_{B_{i_1}} = V_{i_1} - R_{j_1} \cdot we_{k_1} + R_{k_1} \cdot we_{j_1}$ where $we_{k_1}$ and $we_{j_1}$ are components of the vector $\overline{we}$ representing angular velocity of the earth with respect to inertial space.

(23) $\qquad \dot{R}_{B_{j_1}} = V_{j_1} - R_{k_1} \cdot we_{i_1} + R_{i_1} \cdot we_{k_1}$

(23) $\qquad \dot{R}_{B_{k_1}} = V_{k_1} - R_{i_1} \cdot we_{j_1} + R_{j_1} \cdot we_{i_1}$ A scaler value of R, the distance of the missile from the center of the earth, is obtained using the components of R in the base system and the magnitude of the earth's gravitational attraction is obtained as a function thereof. Coordinate converters are employed to convert the components of gravity in the base system to components of gravity in the missile system which are required in the solution of Equations 1–3.

Referring to FIG. 2 accelerometers 10, 11 and 12, which are of the single degree of freedom type described in my copending application Serial No. 625,544, filed November 30, 1956, are mounted along the three fixed axes of the missile, namely, axis $\bar{i}_2$, axis $\bar{j}_2$ and axis $k_2$, respectively. Similarly angle gyros 13, 14 and 15 are also of the same type as described in that application are mounted along the same respective axes.

The integrated output of accelerometers 10, 11 and 12 carried by the missile are transmitted by wireless to differentials 30, 31 and 32, respectively, and the components of linear acceleration of the missile as measured by the accelerometers are continuously corrected for the rotation of the missile system by means of the differentials 30, 31 and 32 which receive the angle gyro outputs as quantities representing the rotation angle of the axes on shafts 33, 34 and 35, respectively. As is hereinafter explained the differential outputs $\Delta a_{i_2}$, $\Delta a_{j_2}$, $\Delta a_{k_2}$ on shafts 36, 37 and 38 are corrected for gravity effect by differentials 40, 41 and 42, respectively. The missile unit connections are shown broken in the schematic to indicate that the means for communicating the information obtained by the gyros and accelerometers in the missile to the rest of the system on the ground would necessarily include some form of wireless such as a telemeter system (not shown).

An integrator section in box 1 constitutes a vector stabilizing system and is employed to compute the velocity components $\overline{V}_{i_2}$, $\overline{V}_{j_2}$ and $\overline{V}_{k_2}$ in the missile system with respect to inertial space in accordance with Equations 1–3.

Differentials 45 and 46 are provided in series connection in shaft 47, which is the output shaft of gravity correction differential 40, and receive the appropriate integrals from the integration sector in box 1 which contains six variable speed devices given reference numerals 50, 51, 52, 53, 54 and 55. In accordance with Equation 1 the discs of the variable speed devices 52 and 54 are driven by the outputs of gyros 14 and 15 which are communicated to disc driving shafts 57 and 58, respectively, as by telemeter. Also, the ball carriages of the devices 52 and 54 are positioned in accordance with the quantities representing velocity components in the missile system along the $j$ and $k$ axes and represented on shaft 61 and corrected shafts 60 and 60a, respectively, as hereinafter explained.

The differentials 45 and 46 combine the outputs of the two variable speed devices 52 and 54 receiving them on shafts 63 and 64 which are respectively connected to the rollers of the two devices. Shaft 65 feeds the differential output to another differential 66 where the velocity increment is converted to a component of velocity along the $i$ axis in the missile system. At the start of operations a constant quantity is placed into the input side of differential 66 by a handcrank to match the velocity to the initial velocity. Shaft 67 receives the output of differential 66 and feeds it back into the integration section on shaft 76 and other sections of the computer to be described.

Similarly, in accordance with Equation 2 differentials 68 and 69 are provided to receive the gravity corrected increment of component velocity in the missile system, $\overline{V}_{j_2}$, represented on shaft 70 and combine therewith the appropriate outputs generated in the integrator section. Accordingly, the discs of variable speed devices 50 and 55 are respectively driven in accordance with the rotational output of gyro 13 which is communicated by wireless to shaft 72 and the output of gyro 15 on shaft 58 respectively and the ball carriages of the device 50 and 55 are respectively positioned by means of shaft 74 which is connected to the shaft 61, and shafts 75 and 76 which are operatively driven by the shaft 67. The differentials 68 and 69 are connected to receive the roller output from the devices 50 and 55 by means of shafts 78 and 79, respectively, and their incremental output is fed to differential 80 into the other input side of which is manually set a constant of integration by a constant of conversion. A velocity component $\overline{V}_{j_2}$ in the missile coordinate system is obtained on shaft 82 as an output of the differential 80 and is similarly fed back into the integration section on the shaft 60 and other sections of the computer.

Finally, differentials 84 and 85 are connected to receive the output of differential 42 on shaft 86 and the integrated outputs from variable speed devices 51 and 53. The ball carriage of variable speed device 51 is positioned by the value for $\overline{V}_{j_2}$ appearing on shaft 60 and this quantity is integrated with respect to the quantity $\phi_{i_2}$ on shaft 72 which is employed to drive the disc of the device. The ball carriage of variable speed device 53 is positioned by shaft 76 on which there is continuously placed values for $\overline{V}_{i_2}$ and this quantity is integrated with respect to the angular quantity $\phi_{j_2}$ appearing on shaft 57 which is employed to drive the disc of the device 53. Shafts 88 and 89 connect the rollers of the devices 51 and 53 to the differentials 84 and 85, respectively, and combine their integrated outputs in accordance with Equation 3. Differential 92 receives the incremental output of the differentials 84 and 85 on shaft 93 and on the introduction of an integration constant as by a handcrank in the manner of differentials 66 and 80 convert incremental components of velocity to a velocity component along the $\bar{k}$ axis in the inertial coordinate system. Shaft 94 conveys this component to shaft 61 as a feed back and to other sections of the computer.

The velocity components in the so-called missile system are then resolved into components with respect to the inertial system I and reference to the base system B of coordinates having axes $i_1$, $j_1$ and $k_1$ which are mutually established at right angles to each other with the $k_1$ axis aligned with the vertical line drawn between the launching site and the center of the earth.

The resolution of the velocity components in the selected refernce system is effected by means of the nine direction cosines $\bar{i}_1 \cdot \bar{i}_2$, $\bar{i}_1 \cdot \bar{j}_2$, $\bar{i}_1 \cdot \bar{k}_2$, $\bar{j}_1 \cdot \bar{i}_2$, $\bar{j}_1 \cdot \bar{k}_2$, $\bar{j}_1 \cdot \bar{j}_2$, $\bar{j}_1 \cdot \bar{j}_2$, $\bar{k}_1 \cdot \bar{i}_2$, $\bar{k}_1 \cdot \bar{j}_2$ and $\bar{k}_1 \cdot \bar{k}_2$. The direction cosines are obtained as the components of unit vectors stabilized in the missile system of coordinates by means of the integrator arrangement shown in box 2, box 2a and box 2b. The connections are identical in the three boxes and therefore a description of the arrangement in box 2 will suffice for the other two with the exceptions explained below. A text explaining the theory of direction cosines is "Introduction to Theoretical Physics" by Leigh Page, published by D. Van Nostrand Company, 3rd Edition, 1952.

The integrators in box 2 are six in number and are arranged in precisely the same fashion as the integrators in box 1. These integrators function to stabilize the resultant vector by maintaining a constant relation between its components which are the required direction cosines. Specifically the integrators in this section are arranged to yield outputs which accord with Equations 10–12. These equations are expressed in terms of increments and therefore the direction cosines are integrated to obtain their instantaneous values.

Therefore, in accordance with Equation 10 the ball carriages of variable speed device 104 is positioned in accordance with the quantity $\bar{i}_1 \cdot \bar{j}_2$ appearing on output shaft 106 and shaft 107 to which carriage is connected. The disc of the device 104 is driven in accordance with the angular quantity $\phi_{k_2} - \phi e_{k_2}$ on shaft 108 and connected shaft 109 which receives the combined output of gyro 15 and box 3 as hereinafter explained. The roller output of the device 104 is conveyed to differential 110 which combines the output with that of variable speed device 102. The disc of the latter is driven in accordance with the quantity $\phi_{j_2} - \phi e_{j_2}$ appearing on shaft 112 which is connected to shaft 114 which receives the angular output of the gyro 14 and box 3a as explained below. The ball carriage of the device 102 is positioned in accordance with the quantity $\bar{i}_1 \cdot \bar{k}_2$, appearing on shaft 126 which is connected to output shaft 127. The combined output of the devices 102 and 104 is placed on differential shaft 115 of differential 110 which leads to an input side of differential 116 to satisfy Equation 10. As an initial setting the constant of integration may be cranked into the other input side of differential 116 having an output shaft 118.

The differential output on the shaft 118, which is connected to output shaft 120, is employed to position the ball carriage of variable speed device 105 the disc of which is driven by the shaft 108 and the shaft 109. Shaft 122 is in operative connection with shaft 124 which receives the combined output of gyro 13 and box 3b and is employed to drive the disc of the device 100. The ball carriage of the variable speed device 100 is positioned by shaft 125 which is connected to the shaft 126 for the direction cosine quantity $\bar{i}_1 \cdot \bar{k}_2$. In the device 100 the quantity $\bar{i}_1 \cdot \bar{k}_2$ is integrated with respect to $\phi_{i_2} - \phi e_{i_2}$. The output of the device 100 on shaft 130 is combined with the output of the device 105 on shaft 132 in differential 134 and the combined output is placed into one side of differential 136 into the other side of which the integration constant for the component $\bar{i}_1 \cdot \bar{j}_2$ is placed in the same manner as in differential 116. The output of differential 136 is placed on connected shafts 138 and 107 to which shaft 106 is connected and equation 11 is accordingly satisfied.

The shaft 107 is also employed to position the ball carriages of variable speed device 101 through connected shaft 139 as well as device 104. The disc of the device 101 is driven by the shafts 122 and 124 and hence the device is adapted to integrate the direction cosine $\bar{i}_1 \cdot \bar{j}_2$ with respect to $\phi_{i_2} - \phi e_{i_2}$. The shaft 118 is connected to shaft 140 which positions the ball carriage of variable speed device 103 in accordance with the direction cosine $\bar{i}_1 \cdot \bar{i}_2$. The disc of the device 103 is driven by shaft 112 connected to shaft 114 being thus adapted to deliver the quantity $\phi_{j_2} - \phi e_{j_2}$, thereto. The roller output of the devices 101 and 103 are conveyed to differential 142 by means of shafts 143 and 144, respectively, and the combined output is placed into differential 145 which is adapted to receive the integration constant for the direction cosine $\bar{i}_1 \cdot \bar{k}_2$ as in the case of differentials 116 and 136. The output of differential 145 is placed on output shaft 127 and Equation 12 is satisfied.

As has been noted the integrator arrangements in box 2a and box 2b are the same as in box 2 and are a mechanization of Equations 13–15 and Equations 15–18, respectively. Essentially all three integrator sections perform the same function which is to stabilize the unit vectors which have direction cosines for components.

Output shafts 106, 120 and 127 are connected into potentiometers 150, 151 and 152, respectively, in the component resolver section of box 4 where the component velocities obtained in box 1 are resolved into components in the base or $i_1$, $j_1$, $k_1$ system by means of the direction cosines, which are fed into this section from box 2, in accordance with Equation 7. To this end the potentiometers 150, 151 and 152 are energized by potentiometers 154, 155 and 153, respectively, whose output is controlled by the shafts 82, 94 and 67 by which are connected to the potentiometers shafts 156, 157 and 158 respectively. Amplifiers 160, 161 and 162 are connected to receive the output of potentiometers 153, 154 and 155, respectively, and their output is connected to the potentiometers 151, 150 and 152, respectively. Series differentials 164 and 165 are connected to the potentiometers 150, 151 and 152 to combine their outputs and as required by Equation 22 the combined output $V_{i_1}$ is fed to a third differential 166 to be combined with the quantities $R_j \cdot we_k$ and $R_{k_1} \cdot we_{j_1}$ so that the resulting velocity component $\bar{R}_{B_1}$ may be referenced to the base B in the base system. The means for computing $R_j \cdot we_k$ and $R_j \cdot we_j$ are described below. The combined quantities are then fed to servo motor 168. A variable speed device 169 is connected to the servo 168 by shaft 170a which positions the ball carriage of the device. A time motor (not shown) drives the disc of the device 169 which is thereby enabled to integrate the velocity component along the $i_1$ axis so as to yield the increment of distance $R_{i_1}$ which is placed in differential 177.

In accordance with Equations 8 and 9 the shafts 67, 82 and 94 connect into potentiometers corresponding to potentiometers 153, 154 and 155 in box 4a and box 4b the elements of which are identical to those contained in box 4. Shafts 170, 171 and 172 feed direction cosines $\bar{j}_1 \cdot \bar{i}_2$, $\bar{j}_1 \cdot \bar{j}_2$ and $\bar{j}_1 \cdot \bar{k}_2$, respectively into box shafts 173, 174 and 175 feed direction cosines $k_1 \cdot i_2$, $k_1 \cdot i_2$, and $k_1 \cdot k_2$, respectively, into box 4b. In box 4a and box 4b, therefore, velocity components referenced to the inertial system, $V_{j_1}$ and $V_{k_1}$ are obtained and in order to produce the distance components $R_{j_1}$ and $R_{k_1}$, respectively, as in box 4 the velocity components are modified to satisfy Equation 23 and Equation 24 for producing velocity components referenced to the base B.

The quantity $R_{i_1}$ obtained in box 4 is fed to a potentiometer 176 by means of shaft 177a and the correction differential 177. The output of the potentiometer 176 is amplified by amplifier 180. The quantity $R_{j_1}$ generated in box 4a is fed to potentiometer 181 by means of shaft 182 and the quantity $R_{k_1}$ is fed to potentiometer 183 by means of shaft 184. Amplifiers 185 and 186 are connected to receive the output of the potentiometers 181 and 183, respectively, and the output of amplifier 186 is fed to angle resolver 187 and back to potentiometer 188 by connection 189 and the output of amplifier 185 is fed to angle resolver 190 and potentiometer 191 by means of connection 192. Amplifier 180 is also connected to the resolver 190 by lead 193 and the combined output of resolver 190 representing $\bar{R}_M$ $\bar{R}_B$ or $\bar{R}$ is amplified by amplifier 194 and fed to the angle resolver 187 and servoed by servo motor 195. The servo output representing polar angle is fed to angle resolver 196 by means of lead 197 and is fed back to the resolver 187 by lead 198. The output of the resolver representing the scaler value of the distance $\bar{R}$ is similarly servoed by servo 199 from which it is introduced to determine a value for gravity, $\bar{g}$, proportional to the distance of the missile from the center of the earth and is then amplified by amplifier 201 and placed into the resolver 196 by shaft 201b.

Servo 202 receives the resolved components $R_{i_1}$ and $R_{j_1}$, representing azimuth angle $A_{z_1}$ from the resolver 190 and introduces the generated quantity into resolver 203 by means of shaft 204 being fed back to the resolver 190 by feed back shaft 205a until its output is nulled.

The resolver 196 is employed to resolve the vectorial quantity $\bar{g}$ for the $\bar{g}$ angle appearing on the shaft 197 into its polar components. The resolver output is amplified by amplified 205 and fed as a gravity component $g_{k_1}$ to box 5, box 5a and box 5b, by means of shaft 230 where they are converted to gravity correction factors for the accelerometers. The output of resolver 196 is also amplified by amplifier 206 and fed to the resolver 203 which resolves the output into the gravity components $g_{i_1}$ and $g_{j_1}$ in accordance with the azimuth angle $A_Z$ on shaft 204 and fed to box 5, and box 5a and box 5b by means of shaft 231 and shaft 232, respectively, in which amplifiers 207 and 208 are provided.

The component $R_{K_1}$, on the shaft 184 is placed in one side of differential 210 in the other side of which the known component $R_B$ is introduced. Differential output shaft 211 is therefore driven in accordance with the quantity $R_{k_1} - R_B$ representing altitude of the missile.

The elements in box 5 are employed to convert the gravity components in the base system to velocity components in the missile system. To this end potentiometer shafts 222, 223, and 224 are connected to shafts 173, 120 and 170 whereby the direction cosines $\bar{k}_1 \cdot \bar{i}_2$, $\bar{i}_1 \cdot \bar{i}_2$ and $\bar{j}_1 \cdot \bar{i}_2$ are fed to potentiometers 225, 226 and 227 in box 5. Gravity components in the base system are conveyed to the potentiometers by the connections 230, 231 and 232 and leads 234, 235 and 236 which are respectively connected thereto. Differentials 237 and 238 are connected in series to receive the output of potentiometers 225, 226, and 227 by means of leads 240, 241 and 242, respectively. The combined components of gravity in the missile system are servoed to integrator 244 by means of servo 245 and the component is integrated with respect to time, the time motor for driving the disc of integrator 244 not being shown. The integrator output represents the resultant change in velocity due to gravity and is used to correct the accelerometer output for this effect. Shaft 248 connects the roller of integrator 244 to differential 40 so that a gravity correction value $G_{i_2}$ for the velocity component along the $i_2$ axis in the missile system $G_{i_2}$ may be used to modify the output of accelerometer 10 in accordance with Equation 1.

Similarly, box 5a and box 5b are provided to generate corrector factors $G_{j_2}$ and $G_{k_2}$ for gravity effect on the velocity components along the $j_2$ and $k_2$ axes, respectively, in the missile system and are therefore connected to the shafts 230, 231 and 232 to receive the gravity components in the base system. Potentiometer shafts 254, 255 and 256 are driven by shafts 106, 171 and 175, respectively, through connections to feed the direction cosines $\bar{j}_1 \cdot \bar{j}_2$, $\bar{i}_1 \cdot \bar{j}_2$, and $\bar{k}_1 \cdot \bar{j}_2$, respectively, to box 5a and similarly potentiometer shafts 258, 259 and 260 are driven by shafts 127, 172 and 175, respectively, through connections to introduce the direction cosines $\bar{j}_1 \cdot \bar{k}_2$, $\bar{j}_1 \cdot \bar{k}_2$ and $\bar{k}_1 \cdot \bar{k}_2$, respectively, to box 5b. Shafts 250 and 252 connect the integrator outputs in boxes 5a and 5b to differentials 41 and 42, respectively, so that the output of accelerometers 11 and 12 may be similarly corrected for gravity effects as required by Equations 2 and 3.

The distance component $R_{i_1}$ is introduced to potentiometer 262 by connected shafts 193 and 265 and to potentiometer 264 by means of connected shafts 193, 265 and 265a while the distance component $R_{j_1}$ is placed in potentiometer 266 by means of shaft 192 and connected shaft 192a. The component $R_{k_1}$ is taken off shaft 189 and placed into potentiometer 267 by means of shaft 268. The angular velocity components of the earth's rotation $$w_{e_{i_1}}, w_{e_{j_1}}$$

and $$w_{e_{k_1}}$$

are placed into the potentiometers 188 and 191, 267 and 262, and 264 and 266, respectively. These are known components and are set into the potentiometers as by handcranks. In accordance with Equation 22, therefore, differential 274 combines the output of potentiometers 266 and 267 and places the quantities $$R_{j_1} \cdot w_{e_{k_1}} - R_{k_1} \cdot w_{e_{j_1}}$$

into differential 166 on shaft 277 as explained above. Similarly, in accordance with Equation 23, differential 278 combines the output of potentiometers 188 and 264 and places the quantity $$R_{i_1} \cdot w_{e_{k_1}} - R_{k_1} w_{e_{i_1}}$$

into the box 4a on shaft 280 and, in accordance with Equation 24, differential 281 combines the output of potentiometers 262 and 191 and places the quantity $$R_{j_1} w_{e_{i_1}} - R_{i_1} w_{e_{j_1}}$$

into the box 4b on shaft 282.

The elements of box 3, and box 3a and box 3b are identical to those in box 5 and are similarly arranged. The function of the box 3 is to transform the components of earth's rotation in the earth system to components in the space system which are required by Equations 10–18. Therefore in accordance with Equation 19 the known incremental components of earth's rotation $$W_{e_{j_1}}$$

is manually placed into potentiometer 284 which combines it with the direction cosine $\bar{j}_1 \cdot \bar{k}_2$ which is generated in box 2a and fed to the potentiometer 284 on shaft 307, the connection between the latter and the box 2a not being shown. Similarly, potentiometer 286 combines the quantity $\bar{i}_1, \bar{k}_2$, which is obtained from box 2 on shaft 308 and the component $$w_{e_{i_1}}$$

which is introduced by hand and the product is combined with the product of potentiometer 284 by means of differentials 288 and 290. Potentiometer 292 produces the product of $\bar{k}_1$, $$\bar{k}_2 \text{ and } w_{e_{k_1}}$$

and introduces it to the differential 290 where it is combined with the output of the potentiometer 286. The component $$w_{e_{k_1}}$$

is manually cranked into the differential 290 which receives the quantity $\bar{k}_1 \cdot \bar{k}_2$ by means of shaft 309. The connection between shafts 308 and 309 and the boxes 2 and 2b respectively are not shown. The output of the three differentials is fed to servo motor 292a which servos the combined products to integrator 294. Roller shaft 296 places the integrator output $\phi e_{k_2}$ into one side of differential 298 while shaft 35 places $\phi_{k_2}$ into the other side thereof. The output of the differential 298 is represented on the shaft 109.

Similarly the units in box 3a and box 3b mechanize Equations 20 and 21 respectively. Three direction cosines input shafts connect box 3a to shafts 172, 106 and 174 to introduce the direction cosines $\bar{j}_1 \cdot \bar{j}_2$, $\bar{i}_1 \cdot \bar{j}_2$ and $\bar{k}_1 \cdot \bar{j}_2$ thereto while hand shafts place the components of earth's rotation $$w_{e_{j_1}},\ w_{e_{i_1}} \text{ and } w_{e_{k_1}}$$

therein. Similarly, direction cosines input shafts connect box 3b to shafts 170, 120 and 173 to introduce the direction cosines $\bar{j}_1 \cdot \bar{i}_2$, $\bar{i}_1 \cdot \bar{i}_2$ and $\bar{k}_1 \cdot \bar{i}_2$ thereto while hand shafts place the components of earth's rotation $$w_{e_{j_1}},\ w_{e_{i_1}} \text{ and } w_{e_{k_1}}$$

therein. The connections of direction cosine input shafts are not shown. Shafts 300 and 302 of box 3a and box 3b respectively feed the quantities $$\phi e_{i_2} \text{ and } \phi e_{i_2}$$

to one side of differentials 304 and 306, respectively. Shafts 34 and 33 connect to the other side of the respective differentials the outputs of which appear on the shafts 114 and 124. The discs of the integrators in box 2 are thus adapted to be driven in accordance with the mathematical requirements of Equations 10–12 and the integrator discs in box 2a and box 2b are driven in accordance with the mechanization requirements of Equations 13–18 for the direction cosines generated therein.

The described computer represents a preferred embodiment of the invention and may be modified by one skilled in the art without departing from the principles and scope of the invention as defined in the appended claims in which

What is claimed is:

1. A system for measuring the velocity of a vehicle in space from flight quantities determined by means of accelerometers and angle gyros disposed in the vehicle, said system comprising component vector stabilizing means for generating signals representing direction cosines, means connected to the output of said component vector stabilizing means for converting the components of earth rotation in a base system of components related to the earth system to components of earth rotation in the vehicle's coordinate system, said converting means having input means settable in accordance with said components of earth rotation in the base system, means adapted to receive said flight quantities from said angle gyros for combining said latter flight quantities with the output of said converting means and introducing said combined quantities as inputs to the component vector stabilizing means, means adapted to receive said flight quantities from said angle gyros and said accelerometers for determining component velocities in the vehicle's coordinate system, means connected to the output of said vector component determining means and to the output of said component vector stabilizing means for transforming the component vectors in the vehicle's coordinate system to component vectors in the base system of coordinates, said transforming means including means for computing distance components, means connected to the distance component computing means and to the component vector stabilizing means for obtaining components of gravity in the base coordinate system and converting said components of gravity to components of gravity in the vehicle's coordinate system, the output of the latter means being connected into the means for determining the component velocities in the vehicle's coordinate system.

2. An indicating system as described in claim 1 wherein a second converting means is connected to said transforming means for converting the signals representing computed changes in velocity in inertial space and referenced to the base system of coordinates to signals representing changes in velocity with respect to the launching site at the origin of the base system and referenced to said base system.

3. An indicating system as described in claim 1 wherein said second converting means includes means for receiving said distance components and employing said distance components to compute converting factors for the signals representing computed changes in velocity referenced to the base system of coordinates, said second converting means having input means settable in accordance with the known components of earth rotation in the base coordinate system.

4. An indicating system as described in claim 3 wherein there is connected to the output of said transforming means means for combining with the vertical distance component a quantity representing the earth's radius whereby the altitude of the object may be determined.

References Cited in the file of this patent

UNITED STATES PATENTS

| | | |
|---|---|---|
| 2,762,123 | Schultz et al. | Sept. 11, 1956 |
| 2,805,022 | Shelley | Sept. 3, 1957 |

OTHER REFERENCES

"Principles of Mathematical Physics" (Houston), published by McGraw-Hill, 1948 (pages 163–166 relied on).

Aviation Week, pp. 43–47, January 9, 1956 ("Inertial Guidance" by P. Klass).